United States Patent

Witt

[15] 3,692,138
[45] Sept. 19, 1972

[54] DUAL STEERING SYSTEM

[72] Inventor: Kenneth C. Witt, Buchanan, Mich.

[73] Assignee: Clark Equipment Company

[22] Filed: Dec. 9, 1970

[21] Appl. No.: 96,559

[52] U.S. Cl. ............................... 180/79.2 R, 60/52 S
[51] Int. Cl. .............................................. B62d 5/08
[58] Field of Search ........ 180/79.2 R, 79.2 B, 79.2 C; 91/413; 60/52 S

[56] References Cited

UNITED STATES PATENTS

| | | | |
|---|---|---|---|
| 3,249,173 | 5/1966 | Gordon | 60/525 X |
| 1,955,922 | 4/1934 | Lamond | 60/52 S |
| 2,111,594 | 3/1938 | Kuzelewski | 60/52 S |
| 3,075,603 | 1/1963 | Baudhuin | 180/79.2 R |
| 3,189,119 | 6/1965 | Moreno et al. | 180/79.2 R |
| 3,333,413 | 8/1967 | Mercier et al. | 60/52 S |

FOREIGN PATENTS OR APPLICATIONS 1,493,468   7/1967   France .................. 180/79.2 B Primary Examiner—Benjamin Hersh
Assistant Examiner—John A. Pekar
Attorney—Kenneth C. Witt, John C. Wiessler, Robert H. Johnson and Lewis J. Llamm

[57] ABSTRACT

A dual fluid steering system utilizing two pumps to supply fluid to actuators which turn the wheels for steering. The control valves and other portions of the system are arranged so that each of the pumps supplies fluid to both of the actuators during normal operation whereby if one of the pumps fails, the other pump can continue to be utilized to operate both actuators and turn both of the wheels at a reduced rate under emergency conditions resulting from the failure of one pump. One control valve is connected to the head end of one actuator and the rod end of the other. The other control valve is connected to the rod end of the one actuator and the head end of the other.

4 Claims, 4 Drawing Figures

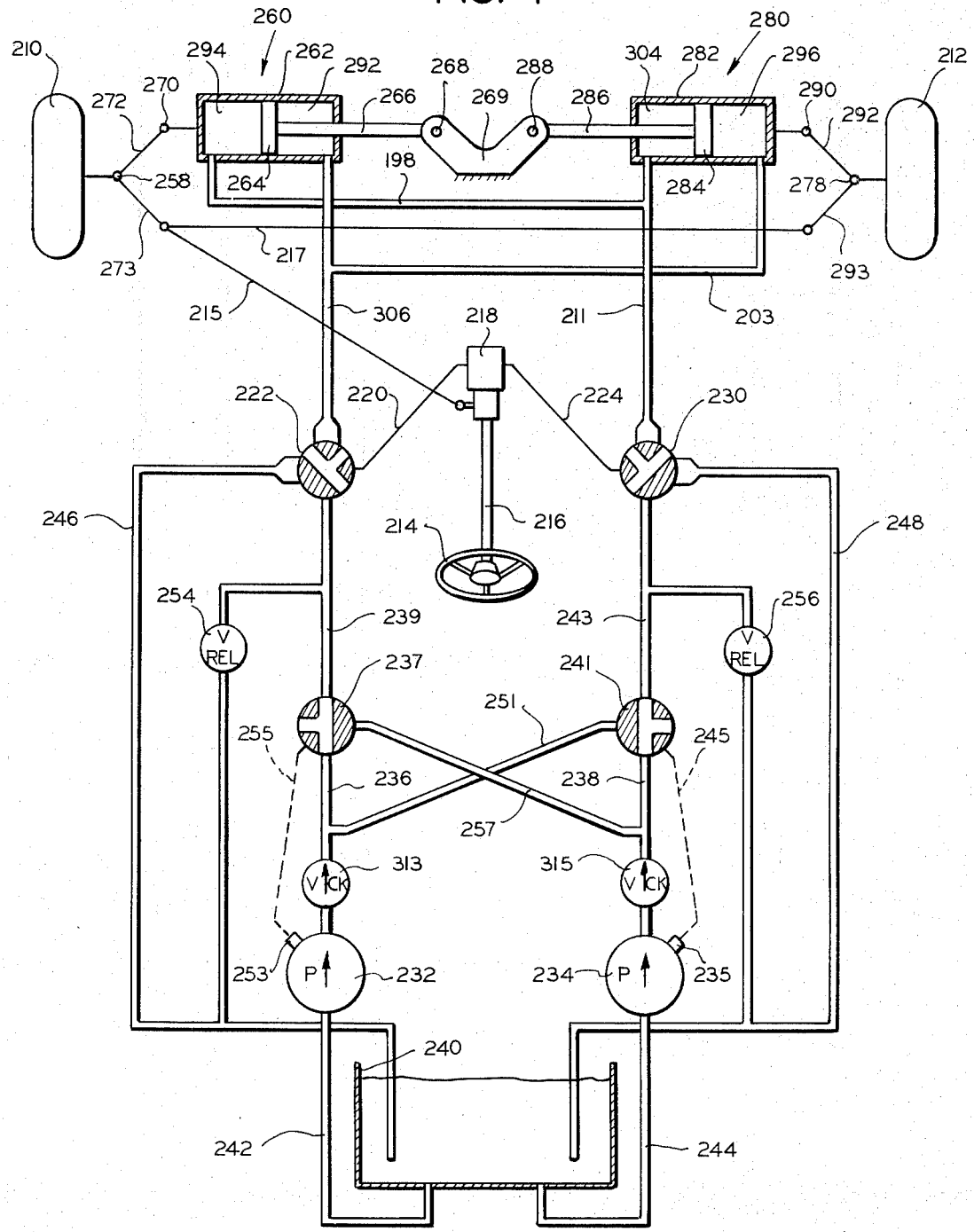

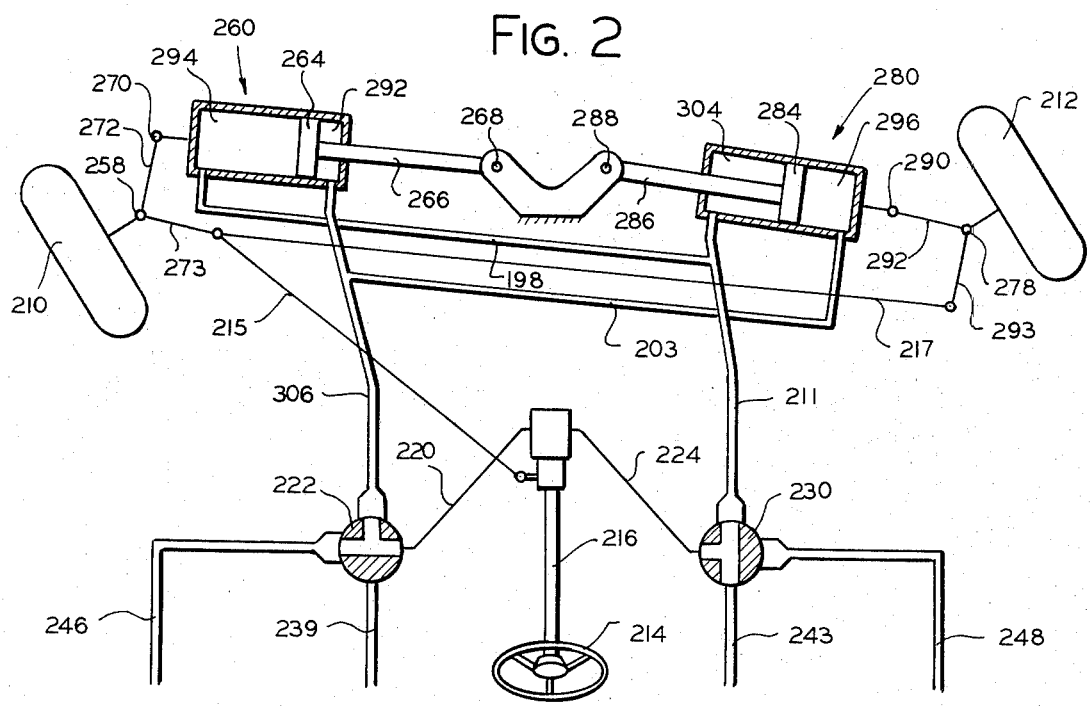
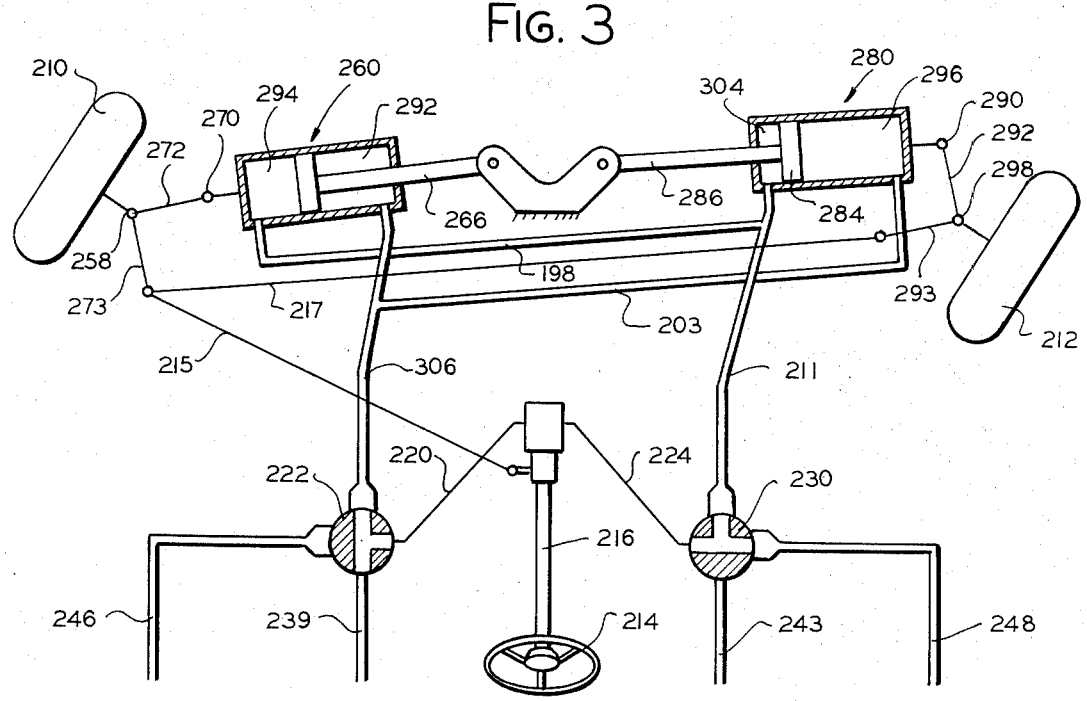

3,692,138

DUAL STEERING SYSTEM

BACKGROUND OF THE INVENTION

The present invention relates generally to fluid operated power steering systems for vehicles and more particularly to a dual system having provision for continued emergency operation even after failure of a portion of the system. It is especially adaptable for use on large, heavy vehicles, but is not limited to such use.

SUMMARY OF THE INVENTION

In carrying out the present invention in one preferred mode, I provide a dual steering system utilizing a pair of expansible and contractible fluid operated devices for pivoting respectively the two dirigible wheels of a vehicle in order to steer it. Two pumps are provided and two valves connected respectively to control the output of the two pumps. One of the valves is connected to the inner end of one of the actuators and the outer end of the other, while the other valve is connected to the outer end of one of the actuators and the inner end of the other. Upon failure of one pump, the steering system still can be operated to turn both wheels at a reduced rate by virtue of additional valves which redirect the fluid under such circumstances.

BRIEF DESCRIPTION OF THE DRAWING

FIG. 1 is a schematic diagram of a fluid steering system embodying the present invention;

FIG. 2 is a partial schematic diagram of a portion of the system of FIG. 1 in a different operating condition;

FIG. 3 is a portion of the system of FIG. 1 in still a different operating condition.

DESCRIPTION OF THE PREFERRED EMBODIMENT

Figure 4:
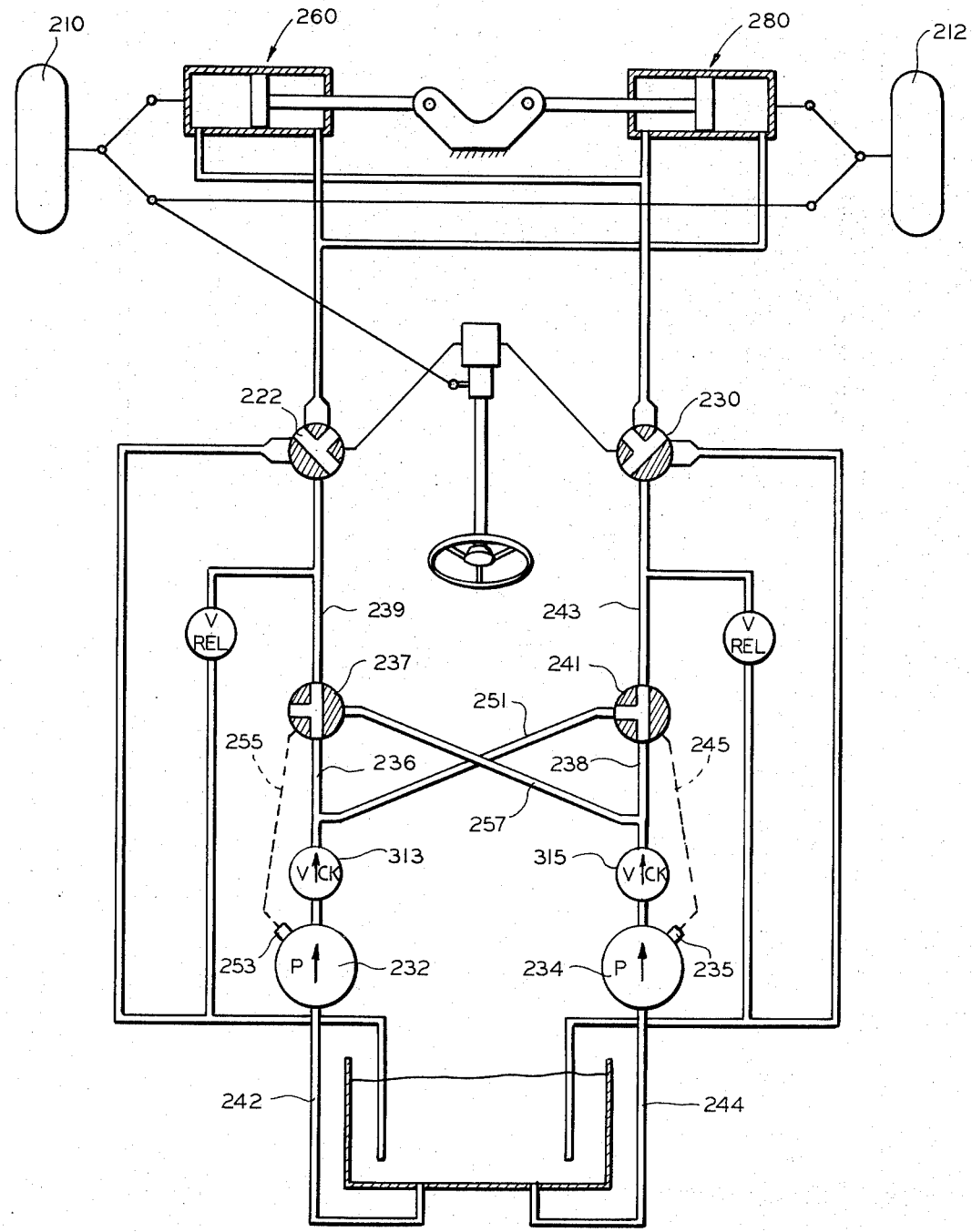
FIG. 4 shows the system of FIG. 1 in a condition providing for emergency operation.

Referring to the drawing, the numerals 210 and 212 indicate dirigible wheels which are turned in unison in order to steer a vehicle. The numeral 214 indicates an operator's steering wheel which is turned by the operator in the usual manner either clockwise to steer the vehicle to the right or counterclockwise to steer the vehicle to the left. The operator's steering wheel 214 is mounted on a steering column 216 which at the bottom has a gear mechanism 218 which is connected by a connection 220 to a steering control valve 222, and by a connection 224 to a steering control valve 230.

The system is supplied with fluid by two pumps 232 and 234 which are driven in a suitable manner such as by the engine of the vehicle. Pump 232 is connected by a conduit 236 through a valve 237 and conduit 239 to steering control valve 222, while pump 234 is connected by conduit 238 through valve 241 and conduit 243 to steering control valve 230. The suction sides of pumps 232 and 234 are connected to a reservoir 240 by means of conduits 242 and 244, respectively.

Drain fluid discharged from valves 222 and 230 flows respectively through conduits 246 and 248 back to the reservoir. Relief valves 254 and 256 to limit the maximum pressure of pumps 232 and 234 respectively, are connected in the usual manner between conduits 239 and 246 and 243 and 248, respectively. While valves 222 and 230 are shown schematically on the drawing, it will be appreciated that such valves preferably are of the so-called open center type whereby when they are in the neutral position, fluid flows freely through them and is returned through conduits 246 and 248, respectively, to the reservoir.

Left wheel 210 is pivoted about vertical axis 258 by means of a piston and cylinder type actuator 260 which includes a cylinder 262 and a piston 264 having a rod 266 secured to the piston. Piston rod 266 is pivotally connected at 268 to a suitable support 269 on the vehicle and the cylinder 262 is pivotally connected at 270 to a link 272 which pivots the wheel 10 as the expansible chamber device 260 is expanded and contracted in a manner to be described. On the right side of the vehicle, the wheel 212 is pivoted about axis 278 and to operate this wheel a piston cylinder type expansible chamber device 280, mounted in allochiral relation to actuator 260, is provided comprising a cylinder 282, a piston 284 and a piston rod 286. The piston rod 286 is pivotally connected at 288 to the support 269 on the vehicle and the cylinder is pivotally connected at 290 to a link 292 which turns the wheel 212 when actuator 280 is expanded or contracted.

Valve 222 normally supplies fluid to or discharges it from the rod end of actuator 260 and from the head end of actuator 280. Conduit 306 connects valve 222 with chamber 292 at the rod end of actuator 260, while conduit 203 connects conduit 306 with chamber 296 at the head end of actuator 280.

The other valve 230 is similarly connected to the chambers 294 and 304, respectively, at the head end of actuator 260 and the rod end of actuator 280. Conduit 211 connects chamber 304 with valve 230, while conduit 198 connects chamber 294 with conduit 211 and thence valve 230.

When it is desired to steer the vehicle to the left, operator's steering wheel 214 is turned counterclockwise, which turns the valves 222 and 230 to the positions indicated schematically in FIG. 2 of the drawing. In this condition, pump 234 discharges fluid through valve 230 and under pressure into chamber 294 to extend actuator 260 and into chamber 304 to contract actuator 280 and cause the desired pivoting of the wheels, counterclockwise as seen on the drawing. At the same time, fluid is discharged from chambers 292 and 296 through valve 222 and conduit 246 back to the reservoir 240.

In order to achieve the operation described in the preceding paragraph, it is necessary to have a mechanical interconnection such as link 217 between the two wheels in order to cause them to operate in unison. Link 217 is connected with the links 272 and 292 which operate the wheels by means of links 273 and 293, respectively.

In order to cause the wheels of the vehicle to assume a position corresponding to the position of the operator's steering wheel, it is necessary to have a follow up connection between the wheels and the mechanism associated with the operator's steering wheel and this is illustrated schematically at 215. The action of this connection is to restore equilibrium in the system, whichever way the operator's steering wheel is turned, and when the turning of the operator's steering wheel 214 is stopped, equilibrium is restored and the pivoting movement of the dirigible wheels 210 and 212 stops.

When such equilibrium is restored, the valves 222 and 230 will again be in the position shown schematically in FIG. 1. In this position, no fluid is admitted to or discharged from any of the chambers of the steering actuators and there is no steering action.

When a right turn is desired, steering wheel 214 is turned clockwise. This causes the valves 222 and 230 to assume the positions indicated schematically in the partial view in FIG. 3 whereby fluid under pressure is admitted from pump 232 through valve 222 to chambers 292 and 296. At the same time, fluid is discharged through valve 230 from chambers 294 and 304.

It will be appreciated that if one of the pumps should fail, such as pump 234, for example, the steering system can still be operated and provide force for pivoting the dirigible wheels at a reduced rate. In such a case, assuming pump 232 remains operative, it may still be utilized for emergency steering to pivot the wheels of the vehicle either to the right or the left but at a slower than normal rate.

Such emergency operation is accomplished by the operation of valve 241 from the closed position shown in FIG. 1 to the open position illustrated in FIG. 4. This may be accomplished automatically in the event of a failure of pump 234 by means of a pressure sensitive device indicated at 235 which by means of a connection 245 opens valve 241 and admits fluid from a conduit 251 which is connected between conduit 236 and valve 241 and thus admits pressurized fluid from pump 232 to both control valves 222 and 230 simultaneously, because valve 237 remains open. Thereupon the steering system can continue to be operated even though one pump is not operating, but of course at a slower than normal rate, such emergency rate being approximately half of the normal rate.

Likewise, if pump 232 should fail, valve 237 is operated in a similar manner by a device 253 which is connected to valve 237 at 255. This then produces operation of the steering system using only the output of pump 234, part of such output passing through conduit 257 to the left control valve 222 while the remainder goes through valve 230, and again steering can be accomplished on an emergency basis at a slower than normal rate.

Check valves 313 and 315 may be inserted in conduits 236 and 238, respectively, at the outlets of pumps 232 and 234, to prevent backflow through one of such pumps during emergency operation of the other.

While I have described and illustrated herein a preferred mode of carrying out my invention in accordance with the statute, it will be appreciated that modifications may be made by those skilled in the art. Accordingly, it should be understood that I intend to cover by the appended claims all such modifications falling within the true spirit and scope of my invention.

I claim:

1. A dual steering system comprising two extensible and contractible fluid actuators, located in allochiral relation and connected respectively to turn pivotally two dirigible wheels of a vehicle, two pumps for supplying fluid to the said actuators, and two steering valves connected respectively to control the outputs of the said two pumps, in a manner one of the said valves being connected to the inner end of one actuator and the outer end of the other and the other valve being connected to the outer end of the one actuator and the inner end of the other such that during normal operation each pump delivers fluid to both actuators but without intermixing of the fluid outputs of the two pumps.

2. A dual steering system as specified in claim 1 in which the said actuators are piston and cylinder type devices arranged with the piston rods inwardly disposed and pivotally connected to the vehicle and the cylinders outwardly disposed and connected to linkages for pivoting the wheels.

3. A dual steering system as specified in claim 2 which includes an operator's steering wheel mounted on a steering mechanism connected to operate the said two valves in unison, a link connecting the two dirigible wheels to maintain them in the desired relationship at all times, and a follow up connection between one of the said wheel linkages and the said valve operating mechanism.

4. A dual steering system as specified in claim 1 which includes a pair of emergency valves located respectively between each said pump and its respective steering valve, conduits connected respectively between each pump and the other emergency valve, whereby upon failure of one of the said pumps an emergency valve may be opened to provide for one pump to supply fluid through both steering valves to accomplish emergency steering at a slower than normal rate.

* * * * *

UNITED STATES PATENT OFFICE
CERTIFICATE OF CORRECTION

Patent No. 3,692,138     Dated September 19, 1972

Inventor(s) Kenneth C. Witt

It is certified that error appears in the above-identified patent and that said Letters Patent are hereby corrected as shown below:

Column 4, Line 16 -

Delete "in a manner"

Signed and sealed this 6th day of February 1973.

(SEAL)
Attest:

EDWARD M. FLETCHER, JR.
Attesting Officer

ROBERT GOTTSCHALK
Commissioner of Patents